United States Patent Office 2,706,718
Patented Apr. 19, 1955

2,706,718

TREATMENT OF CELLULOSIC MATERIAL WITH GUANAMINE RESINS

James K. Dixon, Riverside, and Norman T. Woodberry, Stamford, Conn., assignors to American Cyanamid Company, New York, N. Y., a corporation of Maine No Drawing. Application July 27, 1953,
Serial No. 370,631

8 Claims. (Cl. 260—15)

This invention relates to a process for improving the properties of cellulosic materials and more particularly, to the treatment of viscose rayon dope.

In the past, various aminotriazine resins have been used in attempts to improve the properties of cellulosic materials, particularly their affinity for acid dyeing and their water resistance. The resins have differed considerably, one from the other, in their effectiveness as well as in their manner of application.

For example, many non-colloidal aminotriazine resins cannot be added to a viscose dope and the dope thereafter regenerated to produce and animalized cellulosic material; yet, as described and claimed in our copending application, Serial No. 181,564, filed August 25, 1950 entitled "Animalization of Viscose Rayon," now Patent Number 2,654,715, any colloidal aminotriazine resin may be so applied to produce an animalized fiber. While many non-colloidal aminotriazine resins including methylated trimethylol melamines cannot be added to a viscose dope and the dope thereafter regenerated to produce a cellulosic material of improved properties, the members of a small group of such resins, namely, certain alkylated polymethylol melamines very closely related to the ineffective methylated trimethylol melamine, produce a regenerated cellulose of markedly decreased water absorption when added to the viscose dope as described and claimed in our copending application, Serial No. 196,344 filed November 17, 1950, entitled "Treatment of Cellulosic Material," now Patent Number 2,684,343.

Up to the time of the present invention, then, it was recognized that (1) the effect of any particular aminotriazine resin on the properties of cellulosic material was unpredictable depending, among other things, on the form of the resin and on its mode of incorporation with the cellulose, and (2) no single resin treatment was known which would result in the production of an effectively animalized cellulosic fiber having markedly decreased water absorption.

According to the present invention we have discovered a particular class of non-colloidal aminotriazine resins which impart to cellulose both an affinity for acid dyeing and decreased water absorption.

It is an object of the present invention to produce an animalized cellulosic fiber.

It is another object of the present invention to produce a cellulosic fiber having markedly decreased water absorption.

A further object of the present invention is to produce an animalized cellulosic fiber having decreased water absorption by addition of a resin to a cellulose solution before regeneration thereof.

Another object of the present invention is to produce cellulosic material, i. e., fibers, yarns or fabrics, having an affinity for acid wool dyes.

Still another object of the present invention is the treatment of cellulosic materials with certain aminotriazine resins.

The above and other objects are attained by treating cellulose with a guanamine-formaldehyde resin.

The invention will be described in greater detail in conjunction with the following specific example in which proportions are given in parts by weight unless otherwise indicated.

EXAMPLE 1

170 parts by weight of a 5% aqueous solution of the acetoguanamine resin prepared in the manner set forth below is added to 2,000 parts of the cellulose xanthate solution of 8.5% cellulose content described below. This solution, containing 5% resin based on the cellulose, is spun within 2 hours of the resin addition and regenerated in the usual manner as, for example, by treatment with a bath containing 10% sulfuric acid, 1% zinc sulfate, 14% sodium sulfate, 10% glucose and 65% water. The regenerated fiber is washed in water and the washed fiber is treated with a 0.25% solution of diammonium hydrogen phosphate and then heated at 150° C. for 25 minutes until the resin associated with the fiber is cured.

EXAMPLE 2

Upon repeating Example 1 using 540 parts of the same resin or 15% based on the cellulose, the water absorption is found to be lowered to the neighborhood of 35% and animalizing of the fiber is noted.

EXAMPLE 3

Example 1 is repeated, substituting the benzoguanamine resin described below to produce substantially the same results as obtained in Example 1.

EXAMPLE 4

Upon duplicating Example 2 using the benzoguanamine resin prepared as described below with results of the same order as set forth in Example 2.

In general about 2 to about 20 percent by weight of resin based on the cellulose is recommended and the best results are obtained with 5 to 15 percent of the resin.

*Preparation of acetoguanamine resin*

1250 parts (10 mols) of acetoguanamine, 3240 parts (40 mols) of formalin and about 22 parts of 2 N sodium hydroxide are charged into a suitable vessel. The mixture which has a pH of 7.35 is heated for a half hour to reflux and then refluxed for 30 minutes, about 19 parts of 2 N sodium hydroxide are added, the reaction mixture is filtered, and the pH of the filtrate is adjusted to 8 with additional sodium hydroxide. The material is spray-dried at 270° to 280° C.

*Preparation of benzoguanamine resins*

I. 187 parts (1 mol) of benzoguanamine, 324 parts (4 mols) of formalin and about 2 parts of 2 N sodium hydroxide are charged into a suitable vessel, and the reaction mixture which has a pH of 8.7 is heated to reflux in 30 minutes and refluxed for one hour. The product is tray-dried in a vacuum oven at 50° C. for 21 hours.

II. 107.2 lbs. of benzoguanamine, 92.8 lbs. of formalin and 20 ml. of 2 N sodium hydroxide are charged into a suitable vessel. The reaction mixture which has a pH of 6.4 is heated to reflux in 50 minutes and then refluxed for 2 hours and 35 minutes. The pH is adjusted to 8.1 with 2 N sodium hydroxide, the solution is then concentrated in a vacuum kettle at a vacuum of 52 cm. until the temperature reaches 120° C., i. e., about 2 hours, the vacuum is then increased to 56 cm. and concentration is continued at 120° C. for about 30 minutes. The product is then dumped onto a tray, cooled and ground.

*Preparation of cellulose xanthate solution*

131 parts of bleached alpha-cellulose are steeped in 3000 parts of 18% caustic soda solution for 30 minutes at about 25° C. The resulting mercerized cellulose is subjected to pressure in a hydraulic press until the ratio of caustic soda to cellulose is reduced to about 3.3. The top and bottom sheets in the hydraulic press are discarded, and the remaining 8 middle sheets containing 105 parts of the original dry cellulose are shredded for 50 minutes in a suitable dough mixer and then aged for 3 hours. The resulting alkali cellulose is titrated with acid and found to contain 15.2% caustic soda, which corresponds to a calculated 28.5% cellulose.

270 parts of the alkali cellulose containing 77 parts of cellulose are treated with 24.3 parts of carbon bisulfide and 17.5 parts of caustic soda. The carbon bisulfide is added all at once, and the mixture is agitated in a suitable dough mixer at about 20° C. for 22 hours. After the xanthation is complete, the resulting mixture is diluted with 593 parts of water and the solution is stirred for 1½ hours. It is then aged at about 5° C. The mixture contains 6.5% caustic soda and 8.5% cellulose. Before use, a vacuum is applied to remove air bubbles from the solution.

Other guanamine resins may be substituted for those of the specific examples. Aldehyde, i. e., formaldehyde, acetaldehyde, benzaldehyde, furfural, etc., condensation products of guanamines containing at least one hydrogen atom attached to each amino nitrogen atom and the non-amino group attached to the ring carbon atom containing at least one carbon atom, for example, acetoguanamine, propioguanamine, butyroguanamine, lauroguanamine, benzoguanamine, $\Delta^3$-tetrahydrobenzoguanamine, toluguanamine, napthoguanamine, xyloguanamine, beta-cyanopropioguanamine, phenylacetoguanamine, etc., are examples of suitable resins for application to cellulose material to produce an animalized fiber having low water absorption.

Any acid catalyst generally used to cure aminotriazine resins is suitable for use with the guanamine resins used in the present process. Higher water absorption percentages are obtained in the absence of the catalyst. Such catalysts include hydrochloric acid, phosphoric acid, ammonium chloride, ammonium phosphate, salicylic acid, benzoic acid, phthalic acid, etc. The organic curing catalysts are preferably used with alcohol solutions of resin.

The resin-impregnated cellulose fiber is heated in order to cure the resin.

It is an advantage of the present invention that the guanamine resins may be added directly to the viscose dope which is then spun as usual or it may be added to the dope just behind the spinneret in which case an injection spinning procedure is followed.

This application is a continuation-in-part of our application Serial No. 199,348 filed December 5, 1950, and abandoned subsequent to the filing of the present application.

We claim:

1. A process which comprises adding between about 2 and about 20 parts by weight of a noncolloidal product of the condensation of an aldehyde and a guanamine of the group consisting of acetoguanamine, propioguanamine, butyroguanamine, lauroguanamine, benzoguanamine, $\Delta^3$-tetrahydrobenzo - guanamine, toluguanamine, naphthoguanamine, xyloguanamine, beta-cyano-propioguanamine and phenylacetoguanamine to a regeneratable solution of 100 parts of cellulose present as cellulose xanthate, regenerating the cellulose and curing the resin to obtain a cellulosic material of decreased water absorptivity.

2. A process according to claim 1 in which the guanamine is acetoguanamine.

3. A process according to claim 1 in which the guanamine is benzoguanamine.

4. A process according to claim 1 in which the aldehyde is formaldehye

5. A process according to claim 1 in which the resin is cured by heating in the presence of an acid curing catalyst.

6. A process which comprises adding between 5 and 15 parts by weight of a noncolloidal product of the condensation of formaldehyde and a guanamine of the group consisting of acetoguanamine, propioguanamine, butyroguanamine, lauroguanamine, benzoguanamine, $\Delta^3$-tetrahydrobenzoguanamine, toluguanamine, naphtho-guanamine, xyloguanamine, beta-cyano-propioguanamine and phenylacetoguanamine to a regeneratable solution of 100 parts of cellulose present as cellulose xanthate, regenerating the cellulose and curing the resin by heating in the presence of an acid curing catalyst to obtain an animalized cellulosic material of decreased water absorptivity.

7. A process according to claim 6 in which the guanamine is acetoguanamine.

8. A process according to claim 6 in which the guanamine is benzoguanamine.

No references cited.